(12) United States Patent
Ebata

(10) Patent No.: US 9,714,793 B2
(45) Date of Patent: Jul. 25, 2017

(54) CHEMICAL HEAT STORAGE DEVICE INCLUDING ROTATABLE HEAT STORAGE MATERIAL ACCOMMODATION UNIT

(71) Applicant: AISIN SEIKI KABUSHIKI KAISHA, Kariya-shi (JP)

(72) Inventor: Yusuke Ebata, Seto (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 550 days.

(21) Appl. No.: 13/873,766

(22) Filed: Apr. 30, 2013

(65) Prior Publication Data

US 2014/0014299 A1 Jan. 16, 2014

(30) Foreign Application Priority Data

Jul. 12, 2012 (JP) ................................ 2012-156037

(51) Int. Cl.
*F23L 15/02* (2006.01)
*F28D 17/00* (2006.01)
*F28D 20/00* (2006.01)

(52) U.S. Cl.
CPC .......... *F28D 20/003* (2013.01); *Y02E 60/142* (2013.01)

(58) Field of Classification Search
CPC .. F28D 20/003; F28D 20/0056; F28D 20/023; F28D 20/028; F28D 2020/0013;
(Continued)

(56) References Cited

U.S. PATENT DOCUMENTS 4,233,960 A * 11/1980 Johnson ............. F28D 20/0034
126/400
4,372,376 A 2/1983 Nelson et al.
(Continued)

FOREIGN PATENT DOCUMENTS

CN 101644548 A 2/2010
DE 30 35 386 A1 4/1982
(Continued)

OTHER PUBLICATIONS

J. M. P. Q. Delgado A critical review of dispersion in packed beds; Received: Sep. 13, 2004 / Accepted: Jul. 15, 2005 / Published online: Sep. 14, 2005; Heat Mass Transfer (2006) 42: 279-310.*
(Continued)

*Primary Examiner* — Len Tran
*Assistant Examiner* — Gordon Jones
(74) *Attorney, Agent, or Firm* — Buchanan Ingersoll & Rooney PC

(57) ABSTRACT

Provided is a chemical heat storage device including: a heat storage material accommodation unit which accommodates a chemical heat storage material which generates heat and a reaction product by reversible chemical reaction with a reaction medium, a driving unit which drives rotation of the heat storage material accommodation unit, and a heat exchange unit which includes a heat transfer unit which extends in at least one heat storage material accommodation unit, and is thermally communicated with the inside and the outside of the heat storage material accommodation unit, in which the chemical heat storage material is stirred by rotation of the heat storage material accommodation unit, heat exchange is performed between heat exchange fluid which flows through the heat transfer unit and the chemical heat storage material, and a temperature of the heat
(Continued)

exchange fluid which flows through the heat transfer unit is changed.

15 Claims, 8 Drawing Sheets

(58) Field of Classification Search
CPC ..... F28D 2020/0078; F28D 2020/0095; F28D 11/04; Y02E 60/142
See application file for complete search history.

(56) References Cited

U.S. PATENT DOCUMENTS

| | | | |
|---|---|---|---|
| 4,596,286 A * | 6/1986 | Stetler | F28D 11/04 165/163 |
| 5,957,193 A | 9/1999 | Kanada | |
| 2009/0194250 A1 * | 8/2009 | Kudo | F24H 7/04 165/10 |
| 2011/0226447 A1 | 9/2011 | Mieda | |

FOREIGN PATENT DOCUMENTS

| | | |
|---|---|---|
| DE | 41 08 370 A1 | 9/1992 |
| GB | 2 084 311 A | 4/1982 |
| JP | S62-098151 A | 5/1987 |
| JP | 6-96114 B2 | 11/1994 |
| JP | 9-033185 A | 2/1997 |
| JP | 11-182968 A | 7/1999 |
| JP | 2004-003832 A | 1/2004 |
| JP | 2010-144574 A | 7/2010 |
| JP | 2010-216772 A | 9/2010 |
| JP | 2011-027311 A | 2/2011 |
| JP | 2011-196661 A | 10/2011 |
| JP | 2012-072934 A | 4/2012 |
| JP | 2012-097997 A | 5/2012 |
| JP | 2012-127594 A | 7/2012 |

OTHER PUBLICATIONS

Heat and Mass Transfer in Fixed-bed Tubular Reactor May 1, 2008 Junichiro Kugai accessed:http://www.ems.psu.edu/~elsworth/courses/EGEE520/2008Deliverables/reports/EGEE520jk1.pdf on Sep. 17, 2015.*
http://doc.utwente.nl/38032/1/t000003e.pdf; accessed Sep. 17, 2015 Heat and Mass Transport in Tubular Packed Bed Reactors at Reacting and Non-Reacting Conditions Bert Koning Twente University Press 2002 Ph.D. thesis University of Twente.*
Accessed: http://www.diva-portal.org/smash/get/diva2:348761/FULLTEXT01.pdf Sep. 17, 2015 Heat Exchange in a Fluidized Bed Calcination Reactor; Bjørn Simonsen; Master of Science in Energy and Environment; Jul. 2008; Norwegian University of Science and Technology.*
Description JP2010216772 machine translation.*
Hironao Ogura a, Tetsuya Yamamoto, Hiroyuki Kage, Department of Urban Environment Systems, Faculty of Engineering, Chiba University, 1-33, Energy 28 (2003) 1479-1493; www.elsevier.com/locate/energy.*
Extended European Search Report dated Sep. 24, 2014, issued by the European Patent Office in the European Application No. 13173114.3. (8 pages).
Japanese Office Action issued on Mar. 29, 2016 by the Japanese Patent Office in corresponding Japanese Patent Application No. 2012-156037, and an English Translation of the Office Action. (6 pages).
Office Action (the First Office Action) issued on Dec. 17, 2015, by the State Intellectual Property Office of the People's Republic of China in corresponding Chinese Patent Application No. 201310282596.4, and an English Translation of the Office Action. (14 pages).

* cited by examiner

AT THE TIME OF STORING HEAT
(STORING HEAT OF EXHAUST GAS AT THE TIME OF TRAVELLING)

AT THE TIME OF HEAT GENERATION
(AIR HEATING · HEATING AT THE TIME OF COLD START)

CHEMICAL HEAT STORAGE DEVICE INCLUDING ROTATABLE HEAT STORAGE MATERIAL ACCOMMODATION UNIT

CROSS REFERENCE TO RELATED APPLICATIONS

This application is based on and claims priority under 35 U.S.C. §119 to Japanese Patent Application 2012-156037, filed on Jul. 12, 2012, the entire content of which is incorporated herein by reference.

TECHNICAL FIELD

This disclosure relates to a chemical heat storage device, and to a chemical heat storage device which can be used for a vehicle (particularly, an electric vehicle), an architectural structure, or outdoors.

BACKGROUND DISCUSSION

Recently, a chemical heat storage device has been known as a heater for a vehicle, an architectural structure, or outdoors. For example, in an electric vehicle (EV) which travels using a motor without an engine being mounted on, it is difficult to use heat release of cooling water of an engine as heat for air heating, unlike in a case of a vehicle with an engine driving system. As a heater device usable in such a case, devices (chemical heat storage devices) which use chemical heat storage are disclosed in JP 11-182968A and JP 2010-216772A (References 1 and 2). A chemical heat storage material reacts with a reaction medium to generate heat and a reaction product. Since this reaction is reversible reaction, the chemical heat storage material can be regenerated. In detail, if the reaction medium is water, the chemical heat storage material can be regenerated by heating and dehydration reaction of the reaction product. Hereinafter, regeneration of the chemical heat storage material by heating the reaction product is called heating and regenerating of the chemical heat storage material, if necessary. In addition, generation of heat and the reaction product by reaction of the chemical heat storage material and the reaction medium is called heat generation of the chemical heat storage material.

In a technology disclosed in JP 11-182968A, by providing an electric heater to the outside of a heat storage material accommodation unit which performs reaction of the reaction medium and the chemical heat storage material, the reaction product accommodated in a reaction unit is heated. According to the technology, it is possible to perform heating and regenerating of the chemical heat storage material, however, on the other hand, since the entire heat storage material accommodation unit is heated, efficiency of heating and regenerating of the chemical heat storage material is degraded. That is, in the chemical heat storage device disclosed in JP 11-182968 A, by heating a heater, the reaction unit which is adhered to the heater is indirectly heated. Further, the reaction product in the reaction unit is indirectly heated. Accordingly, in this chemical heat storage device, problems with great heat-transfer loss at the time of heating and regenerating of the chemical heat storage material and degraded heat efficiency at the time of heating and regenerating of the chemical heat storage material.

In a technology disclosed in JP 2010-216772A, a cell obtained by concentrating chemical heat storage materials is manufactured, a flow path is provided in the cell, and fluid with a high temperature flows through the flow path, and thus, a reaction product is heated. By diverting this technology, if a transfer flow path (for example, a flow path of fluid in a case of heating the chemical heat storage material with fluid, hereinafter, called a heat transfer unit, not otherwise specified) of heat is provided in a heat storage material accommodation unit to directly perform heating and regenerating of the chemical heat storage material, it is considered that it is possible to reduce heat-transfer loss at the time of heating and regenerating of the chemical heat storage material, (that is, it is possible to efficiently perform heating and regenerating of the chemical heat storage material), and efficiency of heating and regenerating of the chemical heat storage material is improved.

However, when a plurality of heat transfer units are provided in the heat storage material accommodation unit for transfer of heat in the heat storage material accommodation unit, the chemical heat storage material is interposed between the adjacent heat transfer units. Since the chemical heat storage material is expanded at the time of reaction with the reaction medium (that is, the time of heat generation), the chemical heat storage material which is interposed between the heat transfer units is compressed, and aggregation and solidification thereof between the heat transfer units may occur. Heat is difficult to be transferred to or the reaction medium is difficult to be brought in contact with the center portion of the aggregated/solidified chemical heat storage material. Accordingly, the center portion of the solidified chemical heat storage material is difficult to be used in a cycle of heat generation→heating and regenerating, and as a result, a reaction rate or a reaction speed of the chemical heat storage material may be decreased. That is, the plurality of heat transfer units are provided in the heat storage material accommodation unit for improving the efficiency of heating and regenerating of the chemical heat storage material, however, in practice, the efficiency of the heat generation of the chemical heat storage material and the efficiency of the heating and regenerating of the chemical heat storage material may be degraded because of that.

In addition, if the solidified chemical heat storage material is stuck between the heat transfer units, when replacing the chemical heat storage material of the accommodation unit after a long-term use, a replacement operation is complicated, in some cases.

As described above, in the chemical heat storage device of the related art disclosed in JP 11-182968A and JP 2010-216772A, a mechanism for heating and regenerating of the chemical heat storage material is insufficient, and it is difficult to sufficiently improve the efficiency of heating and regenerating of the chemical heat storage material and the efficiency of heat generation of the chemical heat storage material. In detail, it was difficult to suppress aggregation/solidification of the chemical heat storage material and to efficiently perform heating and regenerating of the chemical heat storage material.

A need thus exists for a chemical heat storage device which is not susceptible to the drawback mentioned above.

SUMMARY

In order to solve the above-described problem, according to an aspect of this disclosure, there is provided a chemical heat storage device including: a heat storage material accommodation unit which accommodates a chemical heat storage material which generates heat and a reaction product by reversible chemical reaction with a reaction medium; a driving unit which drives rotation of the heat storage material accommodation unit; and a heat exchange unit which includes a heat transfer unit which extends in at least one heat storage material accommodation unit, and is thermally communicated with the inside and the outside of the heat storage material accommodation unit, in which the chemical heat storage material is stirred by rotation of the heat storage material accommodation unit, heat exchange is performed between heat exchange fluid which flows through the heat transfer unit and the chemical heat storage material, and a temperature of the heat exchange fluid which flows through the heat transfer unit is changed.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
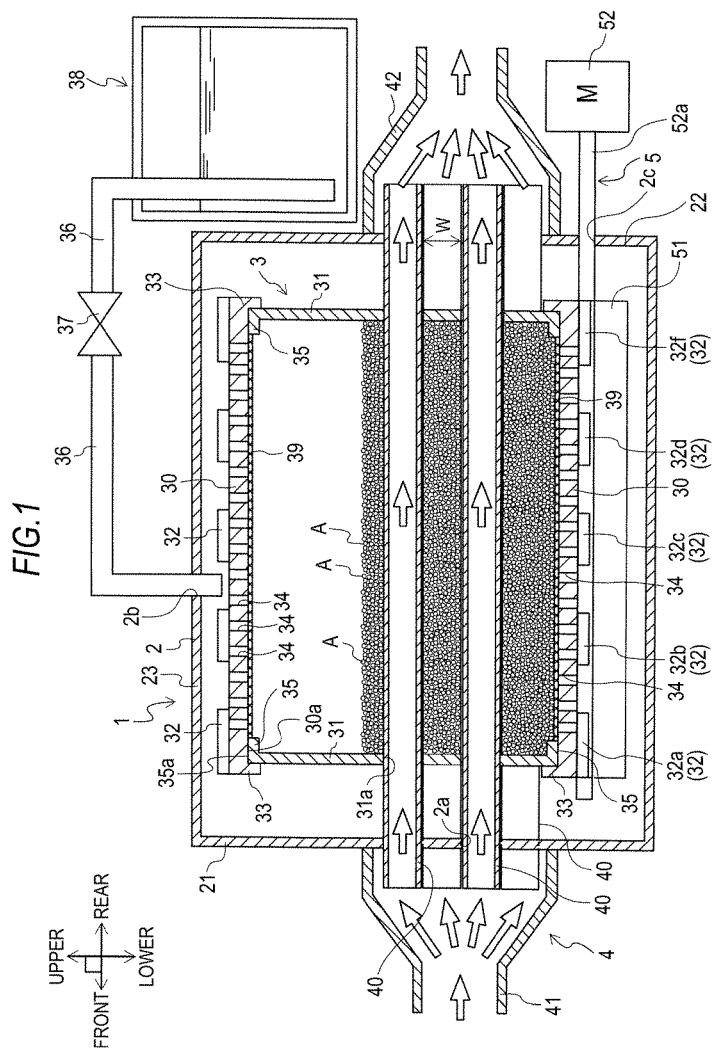
FIG. 1 is a cross-sectional view schematically showing a chemical heat storage device which is cut in an axis direction of a heat storage material accommodation unit according to Embodiment 1 disclosed here.

In the chemical heat storage device disclosed here, at the time of heat generation such as air heating or the like, a heat generation reaction in which a chemical heat storage material which is accommodated in a heat storage material accommodation unit which reversibly reacts with a reaction medium, is generated. At that time, the chemical heat storage material reacts with the reaction medium and becomes a reaction product. The heat generated in the heat storage material accommodation unit is transferred to a heat exchange unit, and heat exchange with a cold source such as air in a vehicle or in a room of a building, or a battery for a vehicle, can be performed. That is, the heat generated by the reaction of the chemical heat storage material and the reaction medium at that time can be used as heat for air heating or other heating. The heat generated in the heat storage material accommodation unit can be subjected to heat exchange with a cold source directly or indirectly, by directly being transferred into a vehicle interior by the heat exchange unit, or making fluid (for example, air for air conditioning) which is further subjected to heat exchange with the heat exchange unit to flow into a car interior using a fluid carrier such as a blower.

In the chemical heat storage device disclosed here, a flow rate control unit for controlling a flow rate of the reaction medium which flows into the heat storage accommodation unit (and/or which flows out from the heat storage accommodation unit) may be provided. In detail, it is preferable that a medium accommodation unit which accommodates the reaction medium and the heat storage material accommodation unit be communicated with each other by a communication path through which the reaction medium can flow, and the flow rate control unit be provided in the communication path. As the flow rate control unit, a valve unit, a variable orifice, or a pump is used, for example. As the valve unit, an orifice type on-off valve and a flow rate variable valve are used, for example. If the flow rate control unit is opened when the pressure of the medium accommodation unit is higher than the pressure of the heat storage material accommodation unit, based on differential pressure, the reaction medium is sent to the heat storage material accommodation unit from the medium accommodation unit through the communication path and the flow rate control unit, reacts with the chemical heat storage material to generate the reaction product and generates reaction heat.

At the time of performing heating and regenerating of the chemical heat storage material (at the time of storing heat), the reaction product accommodated in the heat storage material accommodation unit is heated by performing heat transfer of the heat source existing in the outside of the heat storage material accommodation unit and the internal portion of the heat storage material accommodation unit by the heat exchange unit. In the chemical heat storage device disclosed here, the heat source is not particularly limited, however, for example, in a vehicle, exhaust gas can be used. In this case, a part of the flow path of the exhaust gas may be used as the heat exchange unit. In addition, another part of the flow path of the exhaust gas can be used as the heat transfer unit. That is, a part of the flow path of the exhaust gas may be extended to the inside of the heat storage material accommodation unit, and may heat the reaction product in the heat storage material accommodation unit by the exhaust gas which flows through this flow path. As described above, at the time of performing heating and regenerating of the chemical heat storage material, the reaction product can be heated by transferring heat derived from some heat sources (performing heat exchange with the reaction product), through the heat transfer units (in more detail, heat exchange fluid which flows through the heat transfer unit). The reaction medium is separated from the reaction product, and the reaction product is regenerated as the chemical heat storage material, and can be used for a heater, again.

At that time, since the reaction medium is separated from the reaction product, internal pressure of the heat storage material accommodation unit is gradually increased. If the flow rate control unit is opened at the time when the internal pressure of the heat storage material accommodation unit is higher than the internal pressure of the medium accommodation unit, based on differential pressure, the reaction medium in the storage material accommodation unit is sent to the medium accommodation unit through the communication path and the flow rate control unit, and is accommodated in the medium accommodation unit. After the end of heating and regenerating of the chemical heat storage material, it is preferable to shield the thermal communication between the heat transfer units and the heat sources.

The chemical heat storage material and the reaction medium react reversibly with each other and generate reaction heat. If the reaction product obtained by reacting with the chemical heat storage material is heated, the chemical heat storage material and the reaction medium are reversibly separated. As the chemical heat storage material described above, a compound of alkali earth metal (divalent metal) is used. As the alkali earth metal, calcium (Ca), magnesium (Mg), and barium (Ba) are used. As the compound, hydroxide, oxide, sulfate, nitrate, chloride, and the like are used.

According to reaction formulae exemplified as (I) to (V) described below, as a chemical heat storage material A, calcium oxide (CaO), calcium sulfate ($CaSO_4$), magnesium oxide (MgO), and barium oxide (BaO) are used. As a reaction medium, water having a liquid phase, a gas phase, or gas-liquid phase is used, when price and easy treatment are considered. Hereinafter, the water in various states are collectively referred to as water. As a reaction product, calcium hydroxide ($Ca(OH)_2$), calcium sulfate hemihydrates ($CaSO_4 \cdot \frac{1}{2}H_2O$), calcium sulfate dihydrate ($CaSO_4 \cdot 2H_2O$), magnesium hydroxide ($Mg(OH)_2$), and barium hydroxide ($Ba(OH)_2$) are used.

$$CaO + H_2O \leftarrow\rightarrow Ca(OH)_2 \qquad (I)$$

$$CaSO_4 + \tfrac{1}{2}H_2O \leftarrow\rightarrow CaSO_4 \cdot \tfrac{1}{2}H_2O \qquad (II)$$

$$CaSO_4 + 2H_2O \leftarrow\rightarrow CaSO_4 \cdot 2H_2O \qquad (III)$$

$$MgO + H_2O \leftarrow\rightarrow Mg(OH)_2 \qquad (IV)$$

$$BaO + H_2O \leftarrow\rightarrow Ba(OH)_2 \qquad (V)$$

As shown as the reaction formulae described above, calcium oxide (CaO), calcium sulfate ($CaSO_4$), magnesium oxide (MgO), and barium oxide (BaO) react reversibly with water ($H_2O$) to generate heat. If calcium hydroxide ($Ca(OH)_2$), calcium sulfate hemihydrates ($CaSO_4 \cdot \frac{1}{2}H_2O$), calcium sulfate dihydrate ($CaSO_4 \cdot 2H_2O$), magnesium hydroxide ($Mg(OH)_2$), and barium hydroxide ($Ba(OH)_2$) which are reaction product, are heated as a regeneration treatment, water ($H_2O$) is separated from the reaction product, and calcium oxide (CaO), calcium sulfate ($CaSO_4$), magnesium oxide (MgO), and barium oxide (BaO) which is original starting materials, are reversibly regenerated.

Embodiments disclosed here will be explained with reference to the attached drawings.

Embodiment 1

Figure 2:
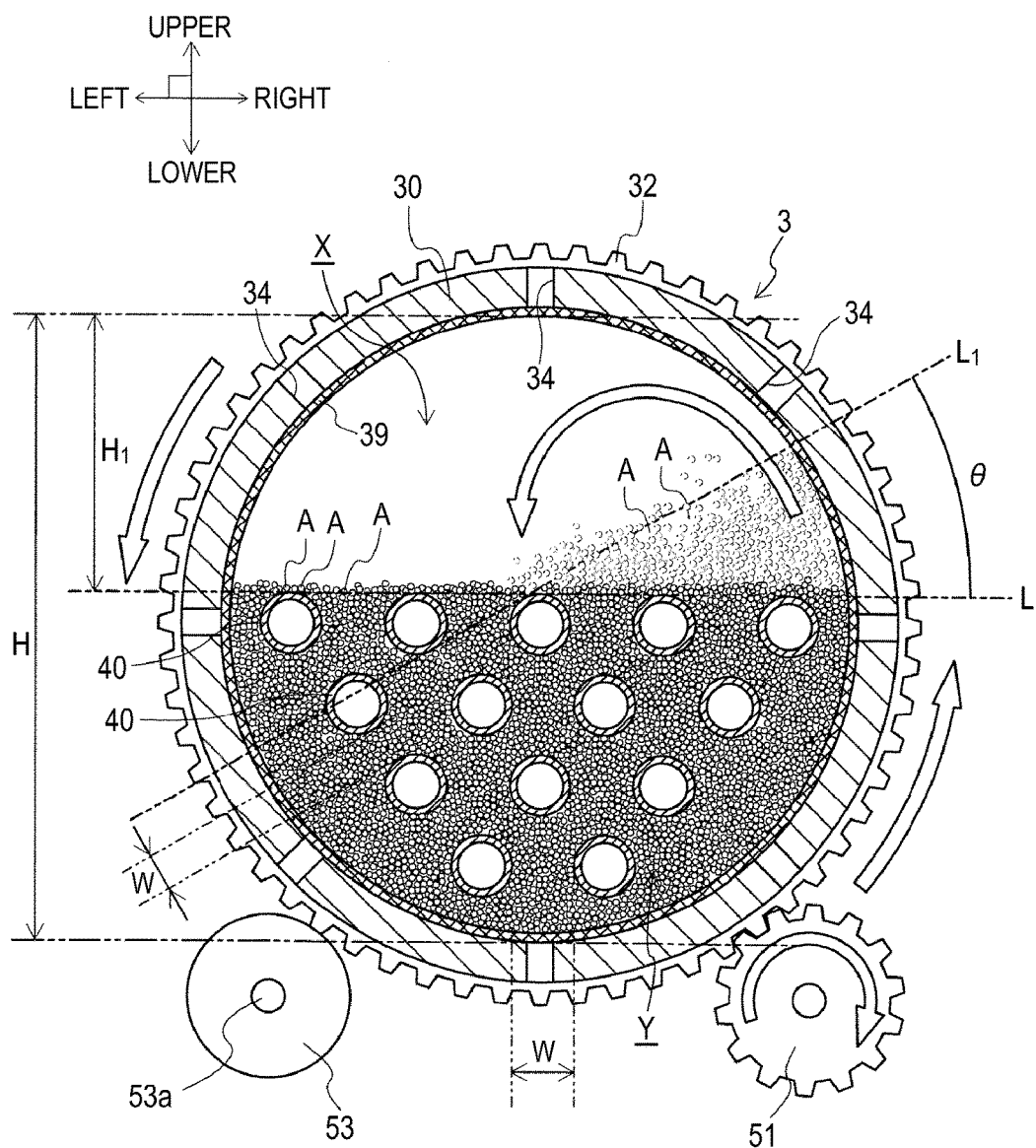
FIG. 2 is a cross-sectional view schematically showing the chemical heat storage device which is cut in a radial direction of the heat storage material accommodation unit according to Embodiment 1.

Hereinafter, a chemical heat storage device 1 disclosed here will be described in reference to detailed examples. As shown in FIGS. 1 and 2, six directions in the chemical heat storage device 1 disclosed here are called, upper, lower, left, right, front, and rear, for convenience. In addition, a vertical direction which will be described later is a direction of a vertical line (direction of gravity, direction perpendicular to a horizontal surface), and a horizontal direction is a direction orthogonally intersecting a direction of gravity of the earth. In the embodiment, the vertical direction indicates upper and lower directions of each drawing, and the horizontal direction indicates a direction of a straight line on a flat surface which passes the front, rear, left, and right directions. In addition, the upper, lower, left, right, front, and rear in Embodiment 2 and subsequent embodiments which will be described later are the same direction as the six directions shown in FIGS. 1 and 2.

Chemical Heat Storage Device

FIGS. 1 and 2 are conceptual view of the chemical heat storage device 1 of Embodiment 1. In detail, FIG. 1 is a cross-sectional view schematically showing the chemical heat storage device 1 of Embodiment 1 which is cut in a flat surface which extends in the horizontal direction (a direction of a rotation axis of a heat storage material accommodation unit which will be described later). FIG. 2 is a cross-sectional view schematically showing the heat storage material accommodation unit and the driving unit of the chemical heat storage device 1 of Embodiment 1 which are cut in a flat surface which extends in the vertical direction (a radial direction of a heat storage material accommodation unit which will be described later).

The chemical heat storage device 1 includes a chamber 2, a heat storage material accommodation unit 3, a heat exchange unit 4, a driving unit 5, a water accommodation unit 38 (reaction medium accommodation unit), a communication path 36, and a valve unit 37 (flow rate control unit). The chemical heat storage device 1 can be used for a vehicle, a household, and industry, for example, and the chemical heat storage device 1 of Embodiment 1 is mounted on a vehicle.

The chamber 2 is a vacuum chamber (chamber with low pressure), and accommodates the heat storage material accommodation unit 3, a part of the heat exchange unit 4, a part of the driving unit 5, and a part of the communication path 36.

The heat storage material accommodation unit 3 is a container having a bottomed tubular shape, which accommodates a granular or powder chemical heat storage material A (calcium oxide, CaO) which reversibly reacts with a reaction medium (water) to generate heat, and has a substantially cylindrical shape. The heat storage material accommodation unit 3 includes a tubular unit 30 which configures a peripheral wall of the bottomed cylinder, a lid unit which configures the bottom of the bottomed cylinder, and a first transfer unit 32 which is exposed to a surface of the tubular unit 30. A particle size of the chemical heat storage material A is set by considering reactivity, passage of the reaction medium, cost, and the like. The material and the size of the heat storage material accommodation unit are not particularly limited, however it is preferably formed with materials having excellent thermal conductivity (for example, metal such as aluminum alloy, copper alloy, carbon steel, and alloy steel, ceramics having excellent thermal conductivity). According to Formula (I) described above, calcium oxide (CaO) reacts with water ($H_2O$) which is a reaction medium, and forms calcium hydroxide ($Ca(OH)_2$) as a reaction product. In this case, reaction heat is generated and a temperature of the heat storage material accommodation unit 3 is increased.

As shown in FIG. 1, both ends of the tubular unit 30 in an axis direction respectively form first edge units 33 which are protruded in an approximately ring shape towards the inside of the tubular unit 30 in the radial direction. The inner diameter of the first edge units 33 is smaller than the outer diameter of lid units 31 which will be described later. As shown in FIGS. 1 and 2, a plurality of hole units 34 are formed to be penetrated into the tubular unit 30. The hole units 34 are disposed to be distributed in a peripheral direction of the tubular unit 30 and a longitudinal direction of the tubular unit 30 (a rotation axis direction of the heat storage material accommodation unit 3 which will be described later). The hole diameter of the hole units 34 is about 7% of a volume average particle diameter of the chemical heat storage material A (with the average particle diameter of the chemical heat storage material A as 100%). In addition, the volume average particle diameter of the chemical heat storage material A indicates a volume average particle diameter of the chemical heat storage material A in a state not reacting with water (reaction medium). In addition, the volume average particle diameter indicates the volume average particle diameter by laser diffraction•scattering method. The first transfer unit 32 is configured with five gears (32*a*, 32*b*, 32*c*, 32*d*, and 32*f*). Each gear is disposed in the same axis direction as the tubular unit 30 and is integrated with the outer periphery of the tubular unit 30. In addition, each gear is arranged along the axis direction of the tubular unit 30. Each gear has an approximately same shape with each other, and tooth row of each gear is aligned. That is, each gear is synchronized and rotated.

The lid units 31 form an approximately circular plate shape, and are respectively attached to both ends of the tubular unit 30. Penetration holes 31*a* having a hole diameter corresponding to the outer diameter of heat transfer units 40 which will be described later are formed in the lid units 31 to have the number corresponding to the number of the heat transfer units 40. The heat transfer units 40 which will be described later are penetrated to for each of the penetration holes 31*a*. In the periphery portions of the lid units 31, second edge units 35 which are protruded in a short barrel shape towards the inside of the heat storage material accommodation unit 3 in the axis direction. That is, the lid units 31 are formed in an approximately bottomed single barrel shape. Outer peripheral surfaces 35*a* of the second edge units 35 face an inner peripheral surface 30*a* of the tubular unit 30. The first edge units 33 are disposed on a front side with respect to the lid units 31 in the axis direction and are locked with plate surfaces of the lid units 31. A part of the tubular unit 30 and a part of the lid units 31 are overlapped with each other by the first edge units 33 and the second edge units 35. In addition, the tubular unit 30 and the lid units 31 are only locked with each other by the first edge units 33 and the second edge units 35, and are not fixed to each other. Accordingly, the tubular unit 30 can be relatively rotated along the peripheral direction of the lid units 31.

The heat exchange unit 4 includes at least one heat transfer unit 40 formed in a tubular shape (in Embodiment 1, 14 units having a straight tubular shape), an inlet unit 41 and an outlet unit 42 which are formed in a tubular shape and cover the end portions of the heat transfer units 40 at both ends of the heat transfer units 40, and heat transfer fluid which flows to the outlet unit 42 from the inlet unit 41 of the heat transfer units 40, and is subjected to heat exchange with the chemical heat storage material A disposed in the vicinity of the heat transfer units 40.

The heat transfer units 40 are made of copper, and the inlet unit 41 and the outlet unit 42 are made of stainless steel. In the chemical heat storage device 1 disclosed here, materials of the heat transfer units 40, the inlet unit 41, and the outlet unit 42 are not particularly limited, however, since the heat transfer unit 40 is necessary to be subjected to heat exchange with the chemical heat storage material A which is accommodated in the heat storage material accommodation unit 3, the materials having excellent thermal conductivity (for example, metal such as aluminum alloy, copper alloy, carbon steel, and alloy steel) are preferably used. As the materials of the inlet unit 41 and the outlet unit 42, the same material as the heat transfer unit 40 may be used, however, when heat loss is considered, the material having lower thermal conductivity than the heat transfer unit 40 (for example, stainless steel or the like) is preferably used. Each heat transfer unit 40 is disposed substantially in parallel with each other.

As shown in FIGS. 1 and 2, a distance W between the adjacent heat transfer units 40 is desirable to be in a grid and in the even distance, and is set to be about 5 to 10 times the volume average particle diameter of the chemical heat storage material. If the distance is smaller than the distance described above, the chemical heat storage material A is easily clogged between the heat transfer units 40 and easily stuck therebetween. In addition, if the distance is greater than the distance described above, the efficiency of heat exchange is degraded. Further, when suppressing of clogging of the chemical heat storage material A is considered, the distance W between the adjacent heat transfer units 40 is preferable to be 3 or more times the volume average particle diameter of the chemical heat storage material, and is more preferable to be 5 or more times the volume average particle diameter of the chemical heat storage material. Meanwhile, when heating efficiency of the chemical heat storage material A is considered, the distance W between the adjacent heat transfer units 40 is preferable to be 13 or less times the volume average particle diameter of the chemical heat storage material and is more preferable to be 10 or less times the volume average particle diameter of the chemical heat storage material. In the circumstances, the distance W between the adjacent heat transfer units 40 is preferable to be about 3 to 13 times the volume average particle diameter of the chemical heat storage material, and is more preferable to be about 5 to 10 times the volume average particle diameter of the chemical heat storage material.

The heat transfer unit 40 is inserted in the penetration holes 31*a* of the lid units 31. Accordingly, most part of the heat transfer units 40 is accommodated in the heat storage material accommodation unit 3 and the chamber 2, however, two end portions of the heat transfer units 40 in the axis direction are exposed to the inside of the chamber 2 and extended to the outside of the chamber 2. Penetration holes 2*a* having a hole diameter corresponding to the outer diameter of the heat transfer units 40 are formed to have the number corresponding to the number of the heat transfer units 40, on a front wall 21 and a rear wall 22 of the chamber 2. Each of the heat transfer units 40 are inserted in each of the penetration holes 21*a*. Accordingly, the heat storage material accommodation unit 3 is fixed to the chamber 2 through the heat transfer units 40. The end portion of each heat transfer unit 40 in the axis direction is covered by the inlet unit 41 and the outlet unit 42.

At the time of heat generation (at the time of using heat, and at the time of cooling), the inlet unit 41 and the outlet unit 42 are connected to a coolant flow path 95 through which liquid flows to an engine 90 and a heater core 93 for a vehicle through valves 92*a* to 92*c*, and at the time of performing heating and regenerating, the inlet unit and the outlet unit are connected to an exhaust gas flow path 91 which approach the outside from the engine 90. In addition, the heater core 93 for a vehicle (shown in FIGS. 4 and 5) is a heat exchanger which is disposed on a rear surface side of a dashboard of a vehicle. The coolant flow path 95 is connected to the engine 90, the heater core 93, and a battery 94.

Figure 4:
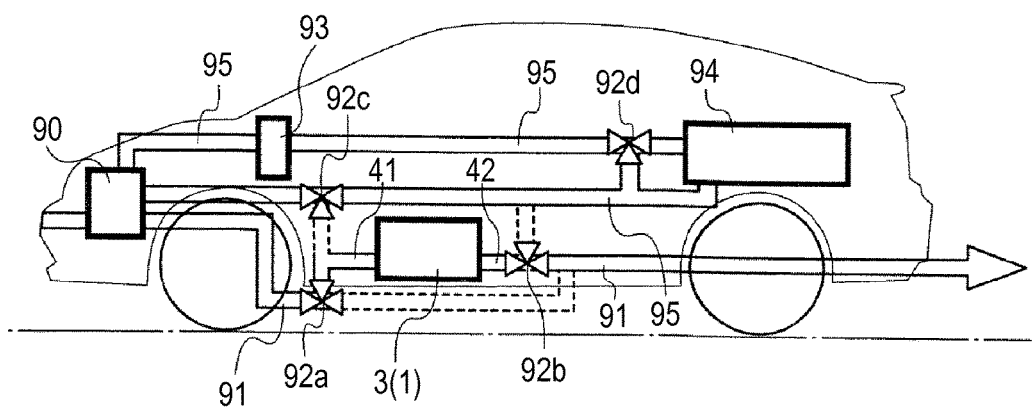
FIG. 4 is an explanatory view schematically showing the chemical heat storage device which is disposed in a vehicle according to Embodiment 1.

In detail, at the time of performing heating and regenerating, that is, at the time of storing heat, the inlet unit 41 and the outlet unit 42 are connected to the exhaust gas flow path 91 which approach the outside from the engine 90 through the valves 92a to 92c (FIG. 4). Accordingly, the exhaust gas flows through the inlet unit 41 and the outlet unit 42. The inlet unit 41 is positioned on an upstream side of the exhaust gas flow path, and the outlet unit 42 is positioned on a downstream side of the exhaust gas flow path. The exhaust gas which flows into the inlet unit 41 through the exhaust gas flow path 91 flows into the heat transfer units 40 through the end portions of the heat transfer units 40, passes through the chamber 2 and the heat storage material accommodation unit 3 through the inside of the heat transfer units 40, and is returned to the exhaust gas flow path 91 through the outlet unit 42. The heat transfer units 40 are exposed to the inside of the heat storage material accommodation unit 3. Accordingly, a part of the chemical heat storage material A which is accommodated in the heat storage material accommodation unit 3 enters between the adjacent heat transfer units 40. As the valves 92a to 92c, the same members as the flow path control unit (valve unit 37) can be used. The exhaust gas flow path 91 and the inlet unit 41 are connected to each other by the valve 92a, the coolant flow path 95 and the inlet unit 41 are disconnected from each other by the valve 92c, and the exhaust gas flow path 91 and the outlet unit 42 are connected to each other and the coolant flow path 95 and the outlet unit 42 are disconnected from each other by the valve 92b, and thus, the exhaust gas flows into the inlet unit 41 and the chemical heat storage material A is heated. In addition, at that time, the coolant in the coolant flow path 95 flows through the engine 90, the heater core 93, and the battery 94, and does not flow into the heat exchange unit 4.

Meanwhile, at the time of heat generation, the coolant flows through the inlet unit 41 and the outlet unit 42. At that time, the inlet unit 41 is positioned on an upstream side of the coolant flow path 95, and the outlet unit 42 is positioned on a downstream side of the coolant flow path 95. The coolant which flows into the inlet unit 41 through the coolant flow path 95 flows into the heat transfer unit 40, passes through the chamber 2 and the heat storage material accommodation unit 3, and is returned to the coolant flow path 95 through the outlet unit 42. At that time, the coolant which flows through the heat transfer unit 40 and content (mainly, the reaction product, the chemical heat storage material A and the reaction medium included, in some cases) of the heat storage material accommodation unit 3 are subjected to heat exchange. That is, at that time, the coolant is heated and the reaction product is cooled. In addition, the coolant flow path 95 and the inlet unit 41 are connected to each other by the valve 92c, the exhaust gas flow path 91 and the inlet unit 41 are disconnected from each other by the valve 92a, the coolant flow path 95 and the outlet unit 42 are connected to each other and the exhaust gas flow path 91 and the outlet unit 42 are disconnected from each other by the valve 92b, and thus the coolant flows into the inlet unit 41. At that time, the coolant which flows into the heat exchange unit 4 and is heated is supplied to the heater core 93. Accordingly, in this case, it is possible to heat air in the vehicle interior. In addition, it is possible to connect the coolant flow path 95 to the coolant flow path for the battery 94 by a valve 92d. Accordingly, at the time of cold start, it is possible to heat the battery 94 by the heated coolant. In addition, at that time, the exhaust gas in the exhaust gas flow path 91 flows out to the outside of the vehicle and does not flow into the heat exchange unit 4.

As shown in FIG. 1, one end portion of the communication path 36 is connected to the water accommodation unit 38. A penetration hole 2b having a hole diameter corresponding to the outer diameter of the communication path 36 is formed on an upper wall 23 of the chamber 2. The other end of the communication path 36 is inserted into the penetration hole 2b, and is fixed to the upper wall 23 of the chamber 2. Accordingly, the water accommodation unit 38 is disposed in a state of being connected to the chamber 2 through the communication path 36. The communication path 36 which is fixed to the upper wall 23 of the chamber 2 faces the tubular unit 30 of the heat storage material accommodation unit 3. The valve unit 37 is attached to the communication path 36 and the communication path 36 can be opened or closed by the valve unit 37. The water accommodation unit 38 accommodates water (reaction medium) in advance, and further accommodates water (reaction medium) which is separated from the reaction product of the chemical heat storage material A which is accommodated in the heat storage material accommodation unit 3 at the time of regeneration. Accordingly, the communication path 36 moves water between the heat storage material accommodation unit 3 and the water accommodation unit 38 by the communication of the heat storage material accommodation unit 3 and the water accommodation unit 38. The valve unit 37 opens and closes the communication path 36.

As shown in FIGS. 1 and 2, the driving unit 5 is configured with a second transfer unit 51, a motor 52, and a rotation auxiliary unit 53. As shown in FIG. 1, the motor 52 is disposed on the outside of the chamber 2. A driving axis 52a of the motor 52 is inserted into the chamber 2 through a penetration hole 2c formed on the rear wall 22 of the chamber 2. The second transfer unit 51 is formed in a gear shape to be engaged with gears 32a to 32f of the first transfer unit 32 described above, and is disposed in the inside of the chamber 2. The rotation auxiliary unit 53 can be rotated around a rotation axis 53a. In the chemical heat storage device 1 of Embodiment 1, the heat storage material accommodation unit 3 is loaded on the second transfer unit 51 and the rotation auxiliary unit 53. The second transfer unit 51 is driven and rotated by the motor 52. If the second transfer unit 51 rotates, the first transfer unit 32 engaged with the second transfer unit 51 (that is, gears 32a to 32f) rotates, and the tubular unit 30 of the heat storage material accommodation unit 3 integrated with the first transfer unit 32 rotates. Accordingly, the chemical heat storage material which is accommodated in the heat storage material accommodation unit 3 is stirred. In addition, the rotation auxiliary unit 53 is press-welded to the heat storage material accommodation unit 3 by gravity. Accordingly, the rotation auxiliary unit 53 is driven to rotate by the rotation of the heat storage material accommodation unit 3, and supports the heat storage material accommodation unit 3. The rotation driving of the tubular unit 30 by the driving unit 5 may be continuously performed, or may be intermittently performed. In addition, the rotation driving of the tubular unit 30 by the driving unit 5 is preferably performed at both times of performing heating and generating, and heat generation. This is because that aggregation•solidification of the chemical heat storage material (that is, reaction product) which is expanded by reaction with the reaction medium between the heat transfer units 40 is suppressed. In the embodiment, when engine 90 or the motor 52 for a vehicle is starting, the heat storage material accommodation unit 3 (in more detail, the tubular unit 30 of the heat storage material accommodation unit 3) is driven by the driving unit 5 and rotates.

Operation of Chemical Heat Storage Device

At the Time of Heat Generation

According to the embodiment, the inside of the water accommodation unit 38, the heat storage material accommodation unit 3, and the communication path 36 are basically in reduced-pressure atmosphere. Accordingly, a part or most parts of water (reaction medium) accommodated in the water accommodation unit 38 are evaporated to become vapor. Also, at the time of a low temperature, large amount of vapor is accommodated in the water accommodation unit 38.

Figure 5:
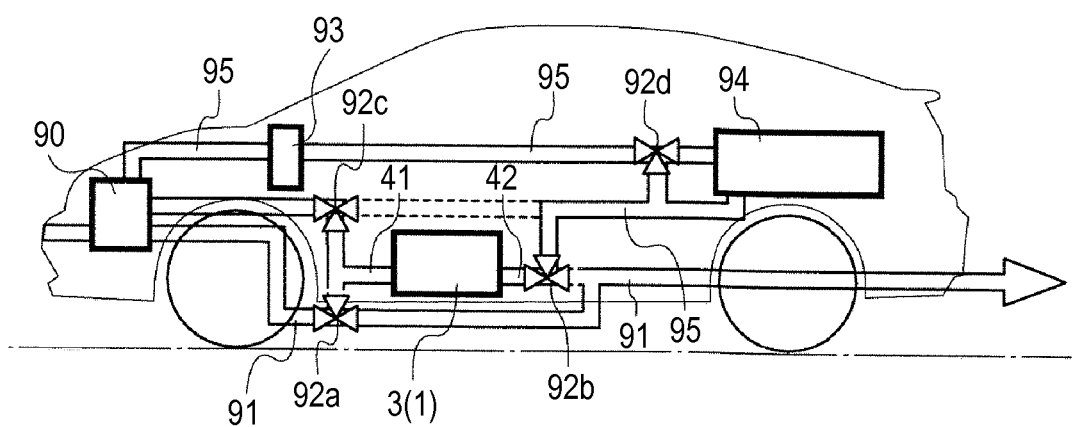
FIG. 5 is an explanatory view schematically showing the chemical heat storage device which is disposed in a vehicle according to Embodiment 1.

Before the heat generation, since the evaporation of the water accommodated in the water accommodation unit 38 proceeds, internal pressure of the water accommodation unit 38 is higher than internal pressure of the heat storage material accommodation unit 3. In this state, if the valve unit 37 is opened by a controller or manually, based on the differential pressure, the vapor (water) in the water accommodation unit 38 is moved to the heat storage material accommodation unit 3 through the communication path 36 and the valve unit 37, and reacts with the chemical heat storage material A in the heat storage material accommodation unit 3. Reaction heat is generated at that time. As described above, the reaction heat is taken to the outside of the heat storage material accommodation unit 3 through the heat transfer units 40 and the coolant flow path 95, and as shown in FIG. 5, the reaction heat is supplied to a vehicle interior as heat for air heating through the heater core 93 for a vehicle. Alternatively, at the time of cold start, the reaction heat is supplied to the battery 94 for a vehicle and heats the battery 94. In addition, at that time, since the driving unit 5 rotates the tubular unit 30 of the heat storage material accommodation unit 3, the chemical heat storage material and the reaction product accommodated in the heat storage material accommodation unit 3 are stirred. Accordingly, aggregation and solidification of the chemical heat storage material and the reaction product are suppressed. In addition, the content (chemical heat storage material or reaction product, water, or the like) in the heat storage material accommodation unit 3 comes in contact evenly with the transfer unit 40. Thus, the efficiency of heat exchange of the content thereof and the heat transfer units 40 is improved. Further, by stirring the water and the chemical heat storage material, they are evenly mixed and the contacting frequency of both of them is improved. Accordingly, since the water circulates the entire chemical heat storage material, the heat generation reaction of the chemical heat storage material and the water is efficiently performed. In addition, at that time, flow of the exhaust gas to the inlet unit 41 is substantially stopped by the valves 92a to 92c.

If the reaction time is continued, and most parts of the vapor (water) which is accommodated in the water accommodation unit 38 is moved to the heat storage material accommodation unit 3 through the communication path 36, the internal pressure of the water accommodation unit 38 is gradually decreased, the differential pressure of the internal pressure of the water accommodation unit 38 and the internal pressure of the heat storage material accommodation unit 3 is decreased, and most parts of the chemical heat storage material in the heat storage material accommodation unit 3 becomes the reaction product. In doing so, since the reaction heat is reduced and the air heating performance is degraded, it is preferable to regenerate the reaction product.

At the Time of Performing Heating and Regenerating
As Shown in FIG. 4, when Regenerating the Reaction Product, the Exhaust Gas Flows into the inlet unit 41 through the valves 92a to 92c. As shown in FIG. 1, the exhaust gas which flows into the inlet unit 41 flows into the heat transfer units 40. Since the heat transfer units 40 are extended in the heat storage material accommodation unit 3, the chemical heat storage material (reaction product) which is accommodated in the heat storage material accommodation unit 3 is subjected to heat exchange with the exhaust gas which flows through the heat transfer units 40, and is heated. Then, the water (vapor) is separated from the reaction product and the chemical heat storage material is regenerated. The heat exchange unit 4 includes the plurality of heat transfer units 40 which are extended in the heat storage material accommodation unit 3, and the reaction product in the heat storage material accommodation unit 3 is heated by the heat transfer units 40. Accordingly, it is possible to efficiently heat the reaction product compared to the case of heating the entire heat storage material accommodation unit 3 by the heat exchange unit 4. In addition, by rotating the heat storage material accommodation unit 3 to stir and heat the reaction product by the driving unit 5, the entire reaction product is heated without unevenness (or with extremely slight heating unevenness), and the heating and regenerating is efficiently performed.

In addition, at that time, since the reaction product discharges the vapor, the internal pressure of the heat storage material accommodation unit 3 gradually becomes high and exceeds the internal pressure of the water accommodation unit 38. In this state, if the valve unit 37 is opened, the vapor (water) which is collected in the heat storage material accommodation unit 3 is moved to the water accommodation unit 38 through the communication path 36 and the valve unit 37, based on the differential pressure, and cooled and condensed in the water accommodation unit 38 to become condensed water with a liquid phase. As described above, the water accommodation unit 38 can function as a condenser. If the chemical heat storage material which is subjected to heating and regenerating, reacts with the water again, the reaction heat is generated and the reaction product is generated, as described above. Accordingly, a step of heat generation→regeneration can be repeatedly performed.

In addition, the structure of the valve unit 37 is not particularly limited. The valve unit 37 may be an on-off valve which is turned on and off. In this case, the controller may continuously open the valve unit 37 and may intermittently open the valve unit. In a case of opening intermittently, if opening time (on time) of the valve unit 37 is adjusted, since it is possible to adjust a flow rate of vapor flowing to the heat storage material accommodation unit 3 from the water accommodation unit 38 for unit time, it is possible to adjust air heating performance of the chemical heat storage device 1. Alternatively, the valve unit 37 may be a variable valve which can change a flow rate of the vapor flowing through the communication path 36 for unit time. In addition, if the flow rate thereof is adjusted, since it is possible to adjust the flow rate of the vapor flowing to the heat storage material accommodation unit 3 from the water accommodation unit 38 for unit time, the air heating performance of the chemical heat storage device 1 may be adjusted.

As described above, according to the chemical heat storage device 1 of Embodiment 1, aggregation•solidification of the chemical heat storage material may be suppressed and the chemical heat storage material may be efficiently subjected to heating and regenerating. In addition, aggregation•solidification of the chemical heat storage material is suppressed, and the clogging of the chemical heat storage material solidified between the heat transfer units 40 is also suppressed. Accordingly, for example, even in a case of exchanging the chemical heat storage material of the heat storage material accommodation unit 3, input and output of the chemical heat storage material to and from the heat storage material accommodation unit 3 can be easily performed.

However, in the chemical heat storage device 1 of Embodiment 1, the heat storage material accommodation unit 3 sets the rotation axis in a direction (front and rear directions and horizontal direction) perpendicular to the vertical direction (upper and lower directions). When the heat storage material accommodation unit 3 sets the rotation axis in a direction intersecting the vertical direction, the chemical heat storage material A is moved upwards along the rotation of the heat storage material accommodation unit 3, and then, is moved downwards by its own weight. Accordingly, in this case, it is advantageous to efficiently stir the chemical heat storage material A. In order to further improve the stirring efficiency of the chemical heat storage material A, it is preferable that the heat storage material accommodation unit 3 set the rotation axis in the horizontal direction (that is, a direction perpendicular to the vertical direction). In addition, the same effect is obtained if an angle (inferior angle) formed by the rotation axis of the heat storage material accommodation unit 3 and the horizontal line is within 45°, and thus, the angle is preferable to be within 20°, and more preferable to be within 10°. When the heat storage material accommodation unit 3 sets the rotation axis in a direction intersecting the vertical direction, the heat transfer unit 40 is preferably extended along the rotation axis of the heat storage material accommodation unit 3. In doing so, the chemical heat storage material A which gets moved up and down easily enters the heat transfer units 40, and the chemical heat storage material A existing between the heat transfer units 40 is easily moved to the outside thereof. In addition, "the heat transfer unit 40 is extended along the rotation axis of the heat storage material accommodation unit 3" herein includes, not only a case where the central axis of the heat transfer unit 40 is parallel with the rotation axis of the heat storage material accommodation unit 3, but also a case where two axis lines intersect each other at an angle within ±10°. In addition, the heat storage material accommodation unit 3 of Embodiment 1 sets the rotation axis in the horizontal direction (that is, a direction perpendicular to the vertical direction), and the central axis of the heat transfer unit 40 is parallel with the rotation axis.

As the chemical heat storage device 1 of Embodiment 1, when the heat storage material accommodation unit 3 sets the rotation axis in a direction intersecting the vertical direction, and the heat transfer unit 40 is extended along the rotation axis of the heat storage material accommodation unit 3, the plurality of heat transfer units 40 are disposed over the vertical direction (upper and lower directions of FIG. 2) and/or the horizontal direction (left and right directions of FIG. 2) in a cross section of the heat storage material accommodation unit 3 in the radial direction (that is, a cross section of the heat storage material accommodation unit 3 in a direction perpendicular to the rotation axis). In the cross section in the radial direction, a region which positions on a lower side of a line L which passes through a point of uppermost side of the heat transfer units 40 positioned on the uppermost side and extended in the horizontal direction of the cross section is called a second region B. In addition, a region which is the remaining region of the cross section in the radial direction, and which positions on the upper side of the line L which passes through a point of uppermost side of the heat transfer units 40 positioned on the uppermost side and extended in the horizontal direction of the cross section is called a first region A. In order to efficiently stir the chemical heat storage material A according to the rotation of the heat storage material accommodation unit 3, it is preferable to provide the first region A which positions on the upper side of the second region B. In addition, in this case, in the cross section of the heat storage material accommodation unit 3 in the radial direction, when a height H of the entire heat storage material accommodation unit 3 (that is, a height of the heat storage material accommodation unit 3 in the vertical direction) is set as 100%, a height of the filled chemical heat storage material is preferable to be equal to or more than 40%, when the heat transfer efficiency is considered. In addition, when a stirring property is considered, the height of the filled chemical heat storage material is preferable to be equal to or less than 60%. That is to say, a depth of the chemical heat storage material A accommodated in the heat storage material accommodation unit 3 is preferable to be equal to or more than 40% and equal to or less than 60%, when the height H of the entire heat storage material accommodation unit 3 is set as 100%.

In addition, as shown in FIG. 2, in the chemical heat storage device 1 disclosed here, when the heat transfer units 40 are extended along the rotation axis of the heat storage material accommodation unit 3 and are aligned linearly in a direction intersecting the vertical direction, the straight line L which connects points on the uppermost side of the plurality of heat transfer units 40 which positioned at the uppermost side can be formed. In Embodiment 1, the straight line L extends in the horizontal direction. When the efficiency of heat exchange of the heat transfer units 40 and the chemical heat storage material A at the time of performing heating and regenerating is considered, there is a preferable range for an angle θ of the straight line L. The preferable range thereof is as follows.

Figure 3:
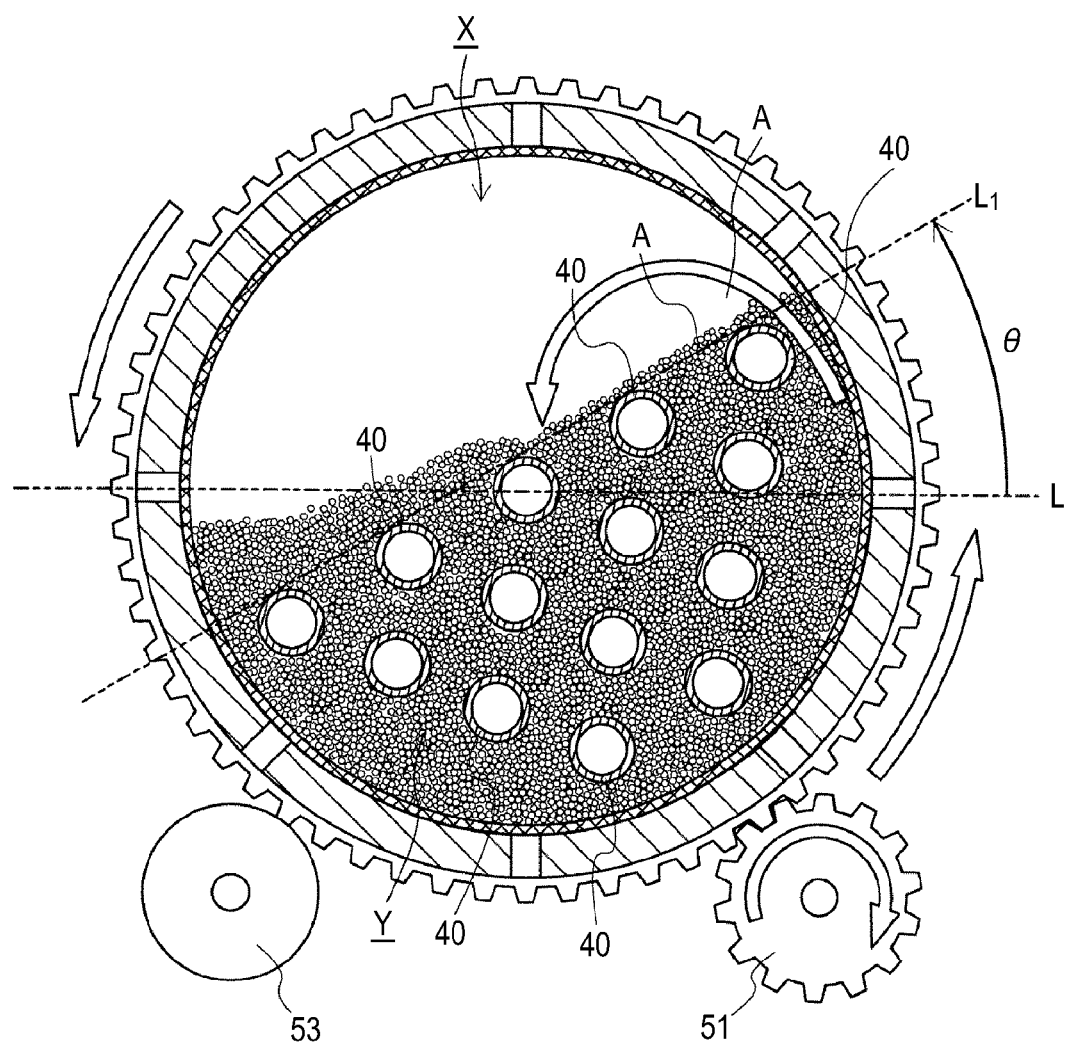
FIG. 3 is a cross-sectional view schematically showing the chemical heat storage device which is cut in a radial direction of the heat storage material accommodation unit according the other arrangement of a heat transfer units in the chemical heat storage device.

As shown in a chain double-dashed line in FIG. 2, if the heat storage material accommodation unit 3 rotates, the chemical heat storage material A is moved to a front side of the rotation direction (in FIG. 2, anticlockwise rotation) of the heat storage material accommodation unit 3. That is, a large number of the chemical heat storage material A is disposed on the front side of the rotation direction, in the heat storage material accommodation unit 3. Accordingly, also a large number of the heat transfer units 40 for performing heating and regenerating of the chemical heat storage material A is preferable to be disposed on the front side of the rotation direction, in the heat storage material accommodation unit 3. In detail, as shown in FIG. 3, the heat transfer unit 40 is particularly preferable to be disposed so that the straight line L in the cross section of the heat storage material accommodation unit 3 in the radial direction is inclined by 30° on the front side of the rotation direction of the heat storage material accommodation unit 3 from the horizontal direction (as $L_1$ in FIGS. 2 and 3). In addition, if inclination 8 of the straight line L with respect to the horizontal line is in a range of 30°±10°, the same effects are obtained.

The chemical heat storage device 1 of Embodiment 1 may only be simply loaded on a vehicle, or may be used for air heating, by transferring the heat generated by the chemical heat storage material to an air conditioning device including the heater core 93 through the coolant flow path 95. In addition, the generated heat may be used for heating the battery 94 or the like. For example, in a hybrid vehicle, when starting a car in a state of a low temperature of the battery 94, for example, winter or the like (that is, at the time of cold start), charge and discharge performance of the battery 94 is not sufficiently exhibited, in some cases. By warming the battery 94 by the heat generated in the chemical heat storage device 1, even at the time of cold start, it is possible to suppress the reduction of the charge and discharge performance of the battery 94. In addition, after the starting, a temperature of the battery 94 increases along the time. In this case, the heat transfer flow path approaching the battery 94 from the heat exchange unit 4 is preferably disconnected.

In Embodiment 1, the first transfer unit 32 (gears 32a to 32f) are formed in the tubular unit 30, however, the location of the first transfer unit 32 is not limited thereto, and for example, may be formed in the lid unit 31. In addition, in Embodiment 1, the heat storage material accommodation unit 3 is rotated by engagement of the gear and the gear, however, the heat storage material accommodation unit 3 may be rotated by the other mechanism (for example, a rack-and-pinion mechanism or a pulley mechanism). Further, a driving force may be transferred by friction engagement. In addition, in a case of transferring the driving force by the engagement of the gear and the gear as Embodiment 1, or a case of transferring the driving force by the rack-and-pinion mechanism or the pulley mechanism, the driving force of the driving unit 5 can be transferred to the heat storage material accommodation unit 3 with high reliability. It is because that, in these cases, since the driving force of the driving unit 5 is transferred as the second transfer unit 51 which is a part of the driving unit 5 presses the first transfer unit 32 which is a part of the heat storage material accommodation unit 3, it is possible to reduce energy loss at the time of transferring of the driving force. In addition, in the chemical heat storage device 1 of Embodiment 1, since the driving force of the driving unit 5 can be transferred to the heat storage material accommodation unit 3 with high reliability, it is possible to confirm the rotation of the heat storage material accommodation unit 3 by only confirming the output of a driving source (for example, motor 52). Accordingly, it is also advantageous since the sensor for rotation confirmation of the heat storage material accommodation unit 3 can be omitted.

In the chemical heat storage device 1 of Embodiment 1, one end of the communication path 36 is communicated with the chamber 2, and water (that is, reaction medium) is supplied to the inside of the heat storage material accommodation unit 3 through the hole units 34 of the tubular unit 30. Accordingly, the hole units 34 which is inlet and outlet of the water are provided on the tubular unit 30 of the heat storage material accommodation unit 3. However, the shape of the heat storage material accommodation unit 3 of the chemical heat storage device 1 disclosed here is not limited thereto, and for example, the hole units 34 may not be provided. In this case, the communication path 36 which is a flow path of the water may be set to extend to the inside of the heat storage material accommodation unit 3, the water may directly flow into the heat storage material accommodation unit 3 from the communication path 36, and the water may directly flow out to the communication path 36 from the inside of the heat storage material accommodation unit 3. In addition, in this case, when the contacting frequency of the water and the chemical heat storage material A is considered, it is preferable to set the communication path 36 to extend along the rotation axis of the heat storage material accommodation unit 3 in the inside of the heat storage material accommodation unit 3. Meanwhile, to efficiently perform stirring of the chemical heat storage material A, it is preferable not to dispose the communication path 36 inside of the heat storage material accommodation unit 3. Accordingly, in the circumstances, as Embodiment 1, it is preferable to introduce the water supplied to the inside of the chamber 2 to the inside of the heat storage material accommodation unit 3 through the hole units 34 which are provided in the tubular unit 30. In this case, since the contacting frequency of the water and the chemical heat storage material A is increased by disposing the hole units 34 over the entire heat storage material accommodation unit 3 in the longitudinal direction, it is possible to improve the efficiency of the heat generation of the chemical heat storage material A.

In addition, in the chemical heat storage device 1 of Embodiment 1, the hole units 34 which is inlet and outlet of the reaction medium, that is, water is provided on the heat storage material accommodation unit 3 (tubular unit 30), and the hole units 34 are covered with fine mesh 39 made of metal, for example. The water (vapor) can flow into and flow out of the hole units 34 and the inside of the heat storage material accommodation unit 3 through the mesh 39, and leakage of the chemical heat storage material A to the outside is shielded by the mesh 39. That is, it is preferable to set the hole diameter of the mesh 39 to a hole diameter through which the vapor can flow and the chemical heat storage material A cannot flow. In detail, the hole diameter is preferable to be about 7% of the volume average particle diameter of the chemical heat storage material A (with the average particle diameter of the chemical heat storage material A as 100%). Accordingly, the chemical heat storage material A is difficult to be leaked out to the outside of the heat storage material accommodation unit 3. Thus, the chemical heat storage device 1 of Embodiment 1 is excellent in durability. In addition, the hole diameter of the mesh 39 is preferable to be equal to or less than the volume average particle diameter of the chemical heat storage material A (less than 100%), and more preferable to be 0.1% to 10%. In the embodiment, the hole units 34 are covered with the mesh 39, however, the mesh 39 may not be provided depending on the hole diameter of the hole units 34 and the particle diameter of the chemical heat storage material A.

In Embodiment 1, the cross section of the heat storage material accommodation unit 3 is formed in an approximately circular bottomed tubular shape, however, the shape of the heat storage material accommodation unit 3 is not limited thereto. For example, the cross section of the heat storage material accommodation unit 3 may be approximately rectangular. In addition, also, in a case of the cross section of the heat storage material accommodation unit 3 with a shape other than the circular shape, the cross section of the heat storage material accommodation unit 3 in a direction perpendicular to the rotation axis is called the cross section of the heat storage material accommodation unit 3 in a radial direction. It is preferable that the cross section of the heat storage material accommodation unit 3 be formed with an approximately circular shape, to efficiently stir the chemical heat storage material. In a case where the cross section of the heat storage material accommodation unit 3 is a rectangular, the shape of the cross section of the heat storage material accommodation unit 3 is preferable to be a polygonal shape such as hexagon or more. In addition, in Embodiment 1, a part (tubular unit 30) of the heat storage material accommodation unit 3 is rotated, and the other part (lid unit 31) thereof is not rotated, however, the entire heat storage material accommodation unit 3 may be rotated according to the circumstances.

In Embodiment 1, calcium oxide (CaO) is used as an example of the chemical heat storage material A, however, it is not limited thereto, and for example, calcium sulfate ($CaSO_4$), magnesium oxide (MgO), and barium oxide (BaO) may be used as an example.

In Embodiment 1, the valve unit 37 is provided as the flow rate control unit, however, the variable orifice or a pump may be additionally used. For example, by using a flow rate variable valve as the valve unit 37, at the time of air heating, the vapor (water) in the water accommodation unit 38 is set to be moved to the heat storage material accommodation unit 3 through the communication path 36 and the valve unit 37, and the vapor reacts with the chemical heat storage material A in the heat storage material accommodation unit 3 and reaction heat is generated as heat for air heating. At that time, by adjusting a flow path cross section area of the valve unit 37, it is possible to adjust air heating output. In addition, at the time of regeneration, it is preferable that the flow path cross section area of the valve unit 37 be set to the maximum value. In this case, the vapor which is heated by the exhaust gas which flows through the heat transfer units 40 and is separated from the reaction product can be rapidly returned to the water accommodation unit 38 from the heat storage material accommodation unit 3. Accordingly, the vapor separation from the reaction product is promoted and the regeneration time can be shortened.

In addition, by detecting the internal pressure of the water accommodation unit 38 and the internal pressure of the heat storage material accommodation unit 3, it is possible to grasp a movement direction of the vapor and to determine whether or not the air heating can be performed. That is, the insides of the water accommodation unit 38, the heat storage material accommodation unit 3, and the communication path 36 are basically reduced pressure atmosphere. Thus, a part or the most parts of the water accommodated in the water accommodation unit 38 are vapor. Before air heating, it is considered that the water accommodation unit 38 and the heat storage material accommodation unit 3 basically have the same temperature. In this case, in a normal state, since the evaporation of the water accommodated in the water accommodation unit 38 with a reduced pressure atmosphere proceeds, in a state where the valve 37 is closed, the internal pressure of the water accommodation unit 38 is higher than the internal pressure of the heat storage material accommodation unit 3. In this state, if the valve unit 37 is opened, based on differential pressure, the vapor (water) in the water accommodation unit 38 is moved to the heat storage material accommodation unit 3 through the communication path 36 and the valve unit 37, and reacts with the chemical heat storage material A in the heat storage material accommodation unit 3.

If the internal pressure of the water accommodation unit 38 is higher than the internal pressure of the heat storage material accommodation unit 3 by a predetermined value or more, the vapor in the water accommodation unit 38 is properly moved to the heat storage material accommodation unit 3 to react with the chemical heat storage material A, by the opening of the valve unit 37, and it is possible to generate the reaction heat as heat for air heating. On the other hand, if there is not differential pressure between the internal pressure of the water accommodation unit 38 and the internal pressure of the heat storage material accommodation unit 3, although the valve unit 37 is opened, the vapor in the water accommodation unit 38 does not move to the heat storage material accommodation unit 3, and heat for air heating is basically not generated. Accordingly, by detecting the internal pressure of the water accommodation unit 38 and the internal pressure of the heat storage material accommodation unit 3, it is possible to grasp the movement direction of the vapor and it is possible to determine whether or not the chemical heat storage device 1 is in a state capable of performing air heating.

In addition, an internal temperature of the water accommodation unit 38 basically affects the amount of vapor generated in the water accommodation unit 38, and the amount of vapor can be converted as vapor pressure of the water accommodation unit 38. An internal temperature of the heat storage material accommodation unit 3 affects the amount of vapor generated in the heat storage material accommodation unit 3, and the amount of vapor basically can be converted as vapor pressure of the heat storage material accommodation unit 3. That is, by detecting the internal temperatures of the water accommodation unit 38 and the heat storage material accommodation unit 3, the high and low state and differential pressure of the internal pressure of water accommodation unit 38 and the internal pressure of heat storage material accommodation unit 3 can be estimated.

Embodiment 2

Figure 6:
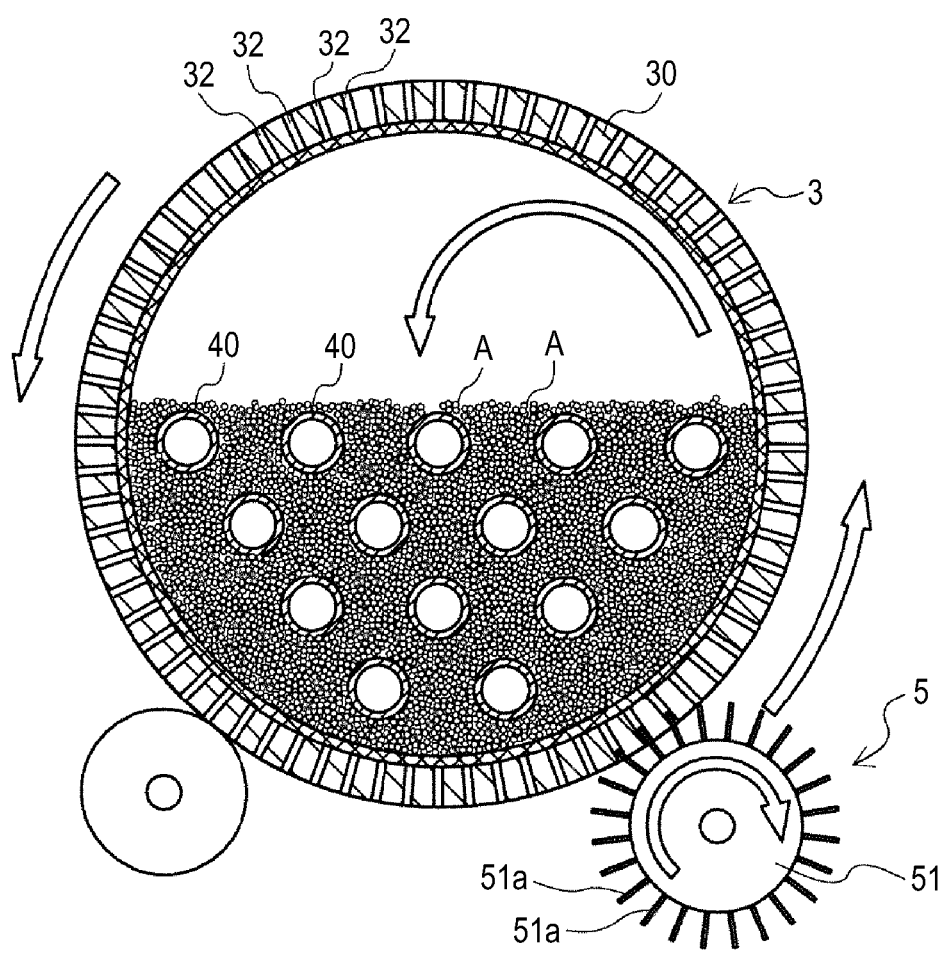
FIG. 6 is a cross-sectional view schematically showing a chemical heat storage device which is cut in a radial direction of a heat storage material accommodation unit according to Embodiment 2.

FIG. 6 is a conceptual view of a chemical heat storage device 1 of Embodiment 2, and is a cross sectional view schematically showing the heat storage material accommodation unit 3 and the driving unit 5 of the heat storage device 1 of Embodiment 2 cut in a flat surface extending in the vertical direction. The chemical heat storage device 1 of Embodiment 2 is substantially the same as the chemical heat storage device 1 of Embodiment 1, except for the first transfer unit 32 and the second transfer unit 51.

As shown in FIG. 6, in the chemical heat storage device 1 of Embodiment 2, the tubular unit 30 of the heat storage material accommodation unit 3 is formed in a net shape having the plurality of penetration holes 32. The second transfer unit 51 is formed in a brush shape having a plurality of protrusions 51a on the surface thereof. The protrusion 51a of the second transfer unit 51 enters the penetration hole 32 of the heat storage material accommodation unit 3 and the protrusion 51a abuts to the inner wall of the penetration hole 32. If the second transfer unit 51 rotates, since the protrusion 51a presses the inner wall of the penetration hole 32, the heat storage material accommodation unit 3 rotates. That is, the penetration holes 32 formed on the heat storage material accommodation unit 3 function as the first transfer unit 32 of the chemical heat storage device 1 of Embodiment 2. In addition, the protrusion 51a enters the penetration hole 32 and is temporally locked with the inner wall of the penetration hole 32, however, after rotating for a predetermined angle, the protrusion 51a comes out to the outside of the penetration hole 32. Then, the protrusion 51a enters the next penetration hole 32. By repeating this, the rotation operation of the second transfer unit 51 is transferred to the heat storage material accommodation unit 3. According to the chemical heat storage device 1 of Embodiment 2, since the protrusions 51a and penetration holes 32 are temporally locked with each other, and the rotation operation of the second transfer unit 51 is transferred to the penetration holes 32, that is, the first transfer unit 32, by pressing the peripheral walls of the penetration holes 32 by the protrusions 51a, it is possible to transfer the rotation operation of the second transfer unit 51 to the first transfer unit 32 with high reliability, and to perform rotation driving of the heat storage material accommodation unit 3 by the driving unit 5 with high reliability.

Since the penetration holes 32 are communicated with the inside and the outside of the heat storage material accommodation unit 3, the penetration holes also function as the flow path of the water (vapor). That is, the penetration holes 32 function as the first transfer unit 32, and also have the same function as the hole unit 34 of the chemical heat storage device 1 of Embodiment 1.

According to the chemical heat storage device 1 of Embodiment 2, since it is possible to have simple shapes for the first transfer unit 32 of the heat storage material accommodation unit 3 and the second transfer unit 51 of the driving unit 5 and to operate the first transfer unit 32 of the heat storage material accommodation unit 3 and the second transfer unit 51 of the driving unit 5 with high reliability, it is advantageous as it is possible to contribute to the reduction of manufacturing cost of the chemical heat storage device 1.

Embodiment 3

Figure 7:
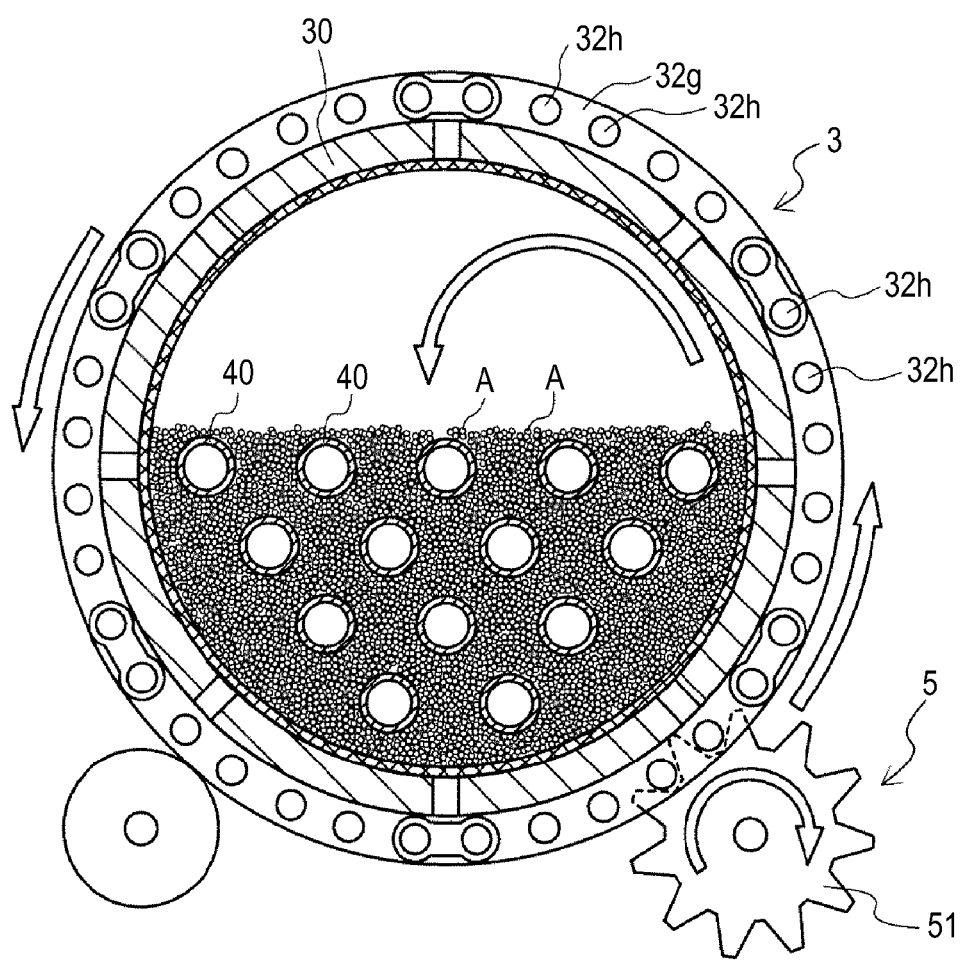
FIG. 7 is a cross-sectional view schematically showing a chemical heat storage device which is cut in a radial direction of a heat storage material accommodation unit according to Embodiment 3.

FIG. 7 is a conceptual view of the chemical heat storage device 1 of Embodiment 3, and is a cross sectional view schematically showing the heat storage material accommodation unit 3 and the driving unit 5 of the chemical heat storage device 1 of Embodiment 3 cut in a flat surface extending in the vertical direction. The chemical heat storage device 1 of Embodiment 3 is substantially the same as the chemical heat storage device 1 of Embodiment 1, except for the first transfer unit 32 and the second transfer unit 51.

In the same manner as the first transfer unit 32 of Embodiment 1, the first transfer unit 32 configures a part of the heat storage material accommodation unit 3 and is integrated to the outer periphery side of the tubular unit 30. The first transfer unit 32 includes a pair of base units 32g which is formed in an approximately ring shape, and a plurality of pins 32h fixed between the pair of base units 32g. The base units 32g are disposed to be separated from each other in a front side-rear side direction of the plan surface of FIG. 7. The pins 32h face the axis direction in a front side-rear side direction of the plan surface of FIG. 7, and are arranged in a peripheral direction of the base units 32g, that is, a peripheral direction of the heat storage material accommodation unit 3.

The second transfer unit 51 is formed in the same gear shape as the second transfer unit 51 of Embodiment 1, and is engaged with the pins 32h. That is, in the chemical heat storage device 1 of Embodiment 3, the second transfer unit 51 transfers the rotation operation to the first transfer unit 32 by the pin gear mechanism. According to the chemical heat storage device 1 of Embodiment 3, as in the same manner as the heat storage device 1 of Embodiment 1, it is possible to transfer the rotation operation of the second transfer unit 51 to the first transfer unit 32 with high reliability, and to perform rotation driving of the heat storage material accommodation unit 3 with high reliability.

Embodiment 4

Figure 8:
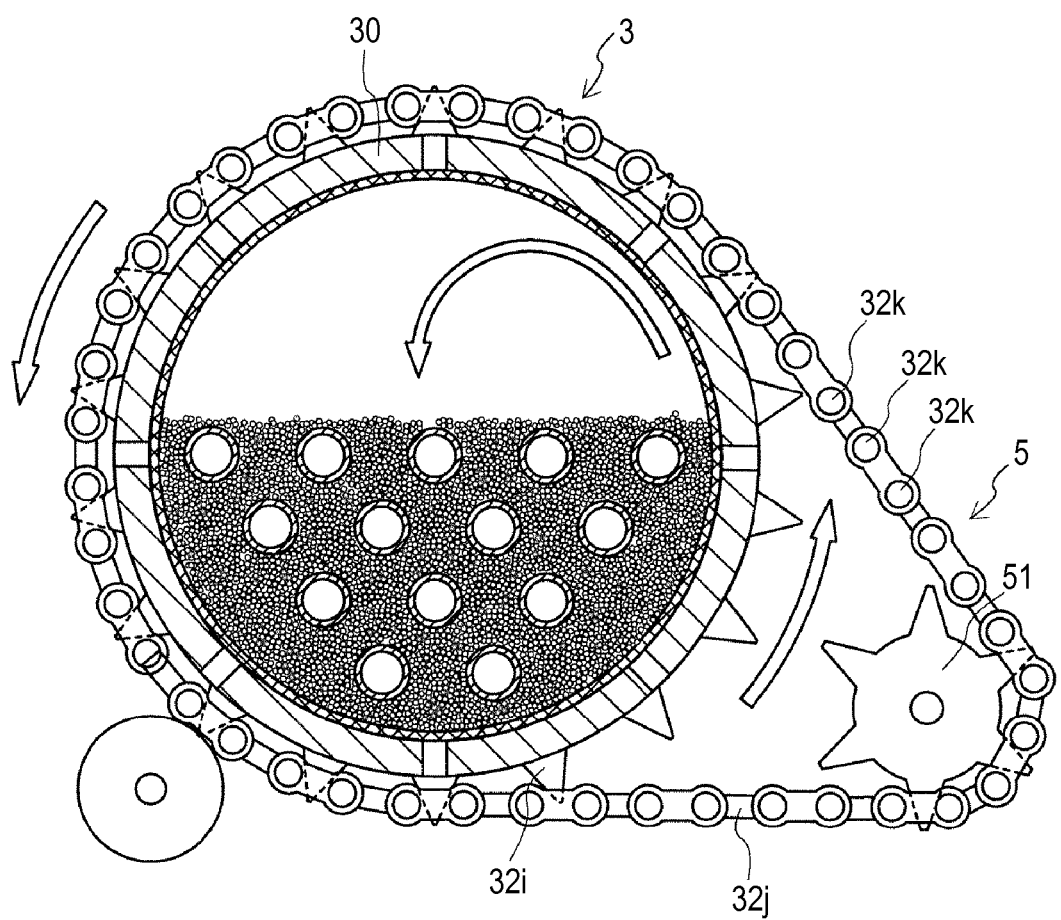
FIG. 8 is a cross-sectional view schematically showing a chemical heat storage device which is cut in a radial direction of a heat storage material accommodation unit according to Embodiment 4.

FIG. 8 is a conceptual view of the chemical heat storage device 1 of Embodiment 4, and is a cross sectional view schematically showing the heat storage material accommodation unit 3 and the driving unit 5 of the chemical heat storage device 1 of Embodiment 4 cut in a flat surface extending in the vertical direction. The chemical heat storage device 1 of Embodiment 4 is substantially the same as the chemical heat storage device 1 of Embodiment 1, except for the first transfer unit 32 and the second transfer unit 51.

The first transfer unit 32 includes a first sprocket gear 32i which is formed in a gear shape and is integrated on the outer periphery side of the tubular unit 30 of the heat storage material accommodation unit 3, and a roller chain 32j which is engaged with the first sprocket gear 32i. The second transfer unit 51 is formed in a sprocket gear shape. The second transfer unit 51 is engaged with the roller chain 32j of the first transfer unit 32. In detail, the roller chain 32j includes a pair of chain units 32k, and a plurality of pins 32l fixed between the pair of chain units 32k. The chain units 32k are disposed to be separated from each other in a front side-rear side direction of the plan surface of FIG. 8. The pins 32l face the axis direction in a front side-rear side direction of the plan surface of FIG. 8, and are arranged in an extending direction of the chain units 32k. The second transfer unit 51 is engaged with the pins 32l of the roller chain 32j. The first sprocket gear 32i is also engaged with the pins 32l of the roller chain 32j.

The second transfer unit 51 and the first sprocket gear 32i are engaged with the roller chain 32j, respectively. Accordingly, the rotation operation of the second transfer unit 51 is transferred to the heat storage material accommodation unit 3 through the roller chain 32j and the first sprocket gear 32i. According to the chemical heat storage device 1 of Embodiment 4, as in the same manner as the chemical heat storage device 1 of Embodiment 1, it is possible to transfer the rotation operation of the second transfer unit 51 to the first transfer unit 32 with high reliability, and to perform rotation driving of the heat storage material accommodation unit 3 with high reliability. In addition, since the first transfer unit 32 includes the roller chain 32j, the flexibility of the location of the second transfer unit 51 and the heat storage material accommodation unit 3 is increased.

Others

The chemical heat storage device 1 disclosed here can be used for heating any items other than a heater in a vehicle, an architectural structure, or outdoors, or the chemical heat storage device 1. The disclosure is not only limited to the embodiments which are described above and shown in the drawings, and various modification can be suitably performed in the scope not departing from the gist thereof.

Therefore, aspects of this disclosure are further described below.

A chemical heat storage device of this disclosure includes: a heat storage material accommodation unit which accommodates a chemical heat storage material which generates heat and a reaction product by reversible chemical reaction with a reaction medium; a driving unit which drives rotation of the heat storage material accommodation unit; and a heat exchange unit which includes a heat transfer unit which extends in at least one heat storage material accommodation unit, and is thermally communicated with the inside and the outside of the heat storage material accommodation unit, in which the chemical heat storage material is stirred by rotation of the heat storage material accommodation unit, heat exchange is performed between heat exchange fluid which flows through the heat transfer unit and the chemical heat storage material, and a temperature of the heat exchange fluid which flows through the heat transfer unit is changed.

By providing the heat transfer unit in the heat storage material accommodation unit, efficiency of heat transfer to the inside and the outside of the heat storage material accommodation unit is improved. In a case of performing heating and regenerating of the chemical heat storage material, for example, a heat source (for example, engine or the like) existing the outside of the heat storage material accommodation unit and the inside of the heat storage material accommodation unit are thermally communicated with each other by the heat exchange unit. By the flow of the heat exchange fluid (for example, exhaust gas or the like) into the heat exchange unit, it is possible to perform heat exchange of the chemical heat storage material (in more detail, reaction product of the chemical heat storage material and the reaction medium) accommodated in the heat storage material accommodation unit and heat exchange fluid. At that time, the reaction product is relatively heated, and becomes the regenerated chemical heat storage material. In addition, in a case of generating heat by the reaction of the chemical heat storage material and the reaction medium, for example, a cold source (for example, a battery, an engine at the time of starting, vehicle interior at the time of cold weather) existing the outside of the heat storage material accommodation unit and the inside of the heat storage material accommodation unit are thermally communicated with each other by the heat exchange unit. By the flow of the heat exchange fluid (for example, cooling water of engine or the like) into the heat exchange unit, it is possible to perform heat exchange of the reaction product accommodated in the heat storage material accommodation unit (the chemical heat storage material and the reaction medium remaining in the heat storage material accommodation unit in addition to the reaction product, depending on the situation) and the heat exchange fluid. At that time, it is possible to heat the cold source described above by the heat generated in the heat storage material accommodation unit. In addition, at that time, the reaction product is relatively cooled. Since the heat transfer unit configuring a part of the heat exchange unit is extended into the heat storage material accommodation unit, it is possible to efficiently perform heat exchange of the chemical heat storage material (reaction product) and the heat exchange fluid.

However, in the chemical heat storage device of the disclosure, by providing the heat transfer unit in the heat storage material accommodation unit, the chemical heat storage material and/or the reaction product enter space between the heat transfer unit and the heat storage material accommodation unit. In a case of the plurality of heat transfer units, the chemical heat storage material and/or the reaction product enter between the heat transfer units. However, by rotation of the heat storage material accommodation unit, the chemical heat storage material accommodated in the heat storage material accommodation unit is stirred and released. Accordingly, it is possible to suppress aggregation•solidification of the chemical heat storage material. In addition, it is possible to make the chemical heat storage material entered between the heat transfer units to flow to be moved to the outside. Thus, according to the chemical heat storage device of the disclosure, it is possible to efficiently transfer heat to the chemical heat storage material by the heat transfer units, and it is possible to suppress aggregation•solidification of the chemical heat storage material by the rotation of the heat storage material accommodation unit. That is, according to the chemical heat storage device of the disclosure, it is possible to suppress aggregation•solidification of the chemical heat storage material and to efficiently perform heating and regenerating of the chemical heat storage material.

The chemical heat storage device of the disclosure preferably includes constituent elements described below.

That is, the chemical heat storage device further includes the reaction medium which is water; a chamber which accommodates the heat storage material accommodation unit in a vacuum state; a hole unit which is formed on the heat storage material accommodation unit, and through which vapor passes, at the time of heat generation by a chemical reaction of the chemical heat storage material and the reaction medium, and at the time of heating the reaction product to eliminate the reaction medium from the reaction product and to regenerate the chemical heat storage material; and a water accommodation unit which is communicated with the inside of the chamber, and in which vapor which is eliminated from the reaction product is condensed and accumulated, at the time of performing heating and regenerating of the reaction product in the heat storage material accommodation unit.

In this case, it is possible to have a relatively simple structure of the chemical heat storage device which inputs and outputs the reaction medium (water) to and from the heat storage material accommodation unit if necessary, and to reduce manufacturing cost of the chemical heat storage device.

In addition, the chemical heat storage device of the disclosure preferably includes constituent elements described below.

That is, when increasing a temperature of the heat transfer unit, by supplying the vapor to the heat storage material accommodation unit from the water accommodation unit through the hole unit, and generating heat by the reaction of the chemical heat storage material with the vapor which is the reaction medium, a temperature of the heat exchange fluid which flows through the heat transfer unit is increased.

In this case, it is possible to have a relatively simple structure of the chemical heat storage device which can efficiently perform heat exchange of the chemical heat storage material and the heat transfer units, and to reduce manufacturing cost of the chemical heat storage device.

In addition, the chemical heat storage device of the disclosure preferably includes constituent elements described below.

That is, the plurality of heat transfer units are provided in a parallel state to be separated from each other, and penetrate the heat storage material accommodation unit.

In this case, by providing the plurality of heat transfer units, heat exchange of the chemical heat storage material and/or the reaction product which are accommodated in the heat storage material accommodation unit, and the heat transfer units may be efficiently performed. In addition, by providing the heat transfer units to be parallel with each other, it is possible to further efficiently perform heat exchange of the chemical heat storage material and the heat transfer units. That is, in a case where the plurality of heat transfer units are not disposed to be parallel with each other, the distance between the heat transfer units is not constant. Accordingly, a portion through which the chemical heat storage material easily passes and a portion through which the chemical heat storage material hardly passes, are generated among intervals between the heat transfer units in the heat storage material accommodation unit. That is, in this case, a movement speed of the chemical heat storage material in the heat storage material accommodation unit is not constant. According to the chemical heat storage device of the disclosure configured as described above, by providing the plurality of heat transfer units in parallel with each other, it is possible to have substantially constant movement speed of the chemical heat storage material in the heat storage material accommodation unit. Accordingly, it is possible to further efficiently perform heat exchange of the chemical heat storage material and the heat transfer units. In addition, the "parallel" herein is a concept including "substantially parallel". For example, an angle formed by adjacent heat transfer units may be 180°±5°.

In addition, the chemical heat storage device of the disclosure preferably includes constituent elements described below.

That is, the heat storage accommodation unit includes a first transfer unit in outer periphery, the driving unit includes a second transfer unit which drives rotation of the first transfer unit, and the driving unit rotates the heat storage material accommodation unit by transferring power to the first transfer unit by the second transfer unit.

In this case, it is possible to have a relatively simple structure of the chemical heat storage device which can rotates the heat storage material accommodation unit with high reliability, and to reduce manufacturing cost of the chemical heat storage device.

In addition, the chemical heat storage device of the disclosure preferably includes constituent elements described below.

That is, a distance between the adjacent heat transfer units is 5 to 10 times a volume average particle diameter of the chemical heat storage material.

In this case, it is possible to widely secure a space in which the chemical heat storage material can be moved, between the heat transfer units. Accordingly, it is possible to further suppress aggregation•solidification of the chemical heat storage material between the heat transfer units.

In addition, the chemical heat storage device of the disclosure preferably includes constituent elements described below.

That is, the heat storage material accommodation unit is a cylindrical unit having a rotation axis to face a horizontal direction and to be extended in the horizontal direction, and is driven by the driving unit to rotate around the rotation axis so that the chemical heat storage material is stirred.

In this case, by only rotating the heat storage material accommodation unit, the chemical heat storage material accommodated in the heat storage material accommodation unit can be stirred substantially evenly in a vertical direction. Accordingly, it is possible to further suppress aggregation•solidification of the chemical heat storage material described above. In addition, the "horizontal direction" herein is a concept including a "substantially horizontal direction" and includes a case of being inclined by about ±5° with respect to the horizontality.

In addition, the chemical heat storage device of the disclosure preferably includes constituent elements described below.

That is, when a depth of the heat storage material accommodation unit is set as 100%, a depth of the accommodated chemical heat storage material in the heat storage material accommodation unit is 40% to 60%.

In this case, it is possible to secure a space in which the chemical heat storage material can be moved, in the heat storage material accommodation unit. Accordingly, it is possible to efficiently stir the chemical heat storage material according to the rotation of the heat storage material accommodation unit.

In the chemical heat storage device of the disclosure, the chemical heat storage material accommodated in the heat storage material accommodation unit is stirred by rotating the heat storage material accommodation unit. Accordingly, it is possible to suppress aggregation solidification of the chemical heat storage material, to improve a contacting frequency of the chemical heat storage material and the reaction medium, and to improve a contacting frequency of the reaction product of the chemical heat storage material and the reaction medium, and the heat exchange unit. Thus, according to the chemical heat storage device of the disclosure, it is possible to suppress the decrease of a reaction rate and a reaction speed of heat generation and the heating and regenerating of the chemical heat storage material.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A chemical heat storage device comprising:
a heat storage material accommodation unit which accommodates a chemical heat storage material which generates heat and a reaction product by reversible chemical reaction with a reaction medium which is water;
a driving unit which drives rotation of the heat storage material accommodation unit;
a heat exchange unit which includes a heat transfer unit which extends in at least one heat storage material accommodation unit, and is thermally communicated with the inside and the outside of the heat storage material accommodation unit;
wherein the chemical heat storage material is stirred by rotation of the heat storage material accommodation unit, heat exchange is performed between heat exchange fluid which flows through the heat transfer unit and the chemical heat storage material, and a temperature of the heat exchange fluid which flows through the heat transfer unit is changed;
the heat storage material accommodation unit being a cylindrical unit having a rotation axis extending in a horizontal direction, the driving unit rotating the heat storage material accommodation unit around the rotation axis so that the chemical heat storage material is stirred;
the heat transfer unit penetrating the heat storage material accommodation unit along the rotation axis of the heat storage material accommodation unit;
a chamber which accommodates the heat storage material accommodation unit in a vacuum state; and
the heat storage material accommodation unit possessing an outer peripheral surface, the heat storage material accommodation unit being provided with a plurality of through holes opening onto the outer peripheral surface of the heat storage material accommodation unit and through which passes vapor produced when heat is generated by a chemical reaction of the chemical heat storage material and the reaction medium, and through which passes vapor produced when heating the reaction product to eliminate the reaction medium from the reaction product to regenerate the chemical heat storage material.

2. The chemical heat storage device according to claim 1, further comprising:
a water accommodation unit which is communicated with the inside of the chamber, and in which vapor which is eliminated from the reaction product is condensed and accumulated, at the time of performing heating and regenerating of the reaction product in the heat storage material accommodation unit.

3. The chemical heat storage device according to claim 2, wherein, when increasing a temperature of the heat transfer unit, by supplying the vapor to the heat storage material accommodation unit from the water accommodation unit through the through holes of the heat storage material accommodation unit, and generating heat by the reaction of the chemical heat storage material with the vapor which is the reaction medium, the temperature of the heat exchange fluid which flows through the heat transfer unit is increased.

4. The chemical heat storage device according to claim 1, wherein the heat transfer unit is provided in a parallel state to be separated from another heat transfer unit.

5. The chemical heat storage device according to claim 2, wherein the heat transfer unit is provided in a parallel state to be separated from another heat transfer unit.

6. The chemical heat storage device according to claim 3, wherein the heat transfer unit is provided in a parallel state to be separated from another heat transfer unit.

7. The chemical heat storage device according to claim 1,
wherein the heat storage accommodation unit includes a first transfer unit in outer periphery,
the driving unit includes a second transfer unit which drives rotation of the first transfer unit, and
the driving unit rotates the heat storage material accommodation unit by transferring power to the first transfer unit by the second transfer unit.

8. The chemical heat storage device according to claim 2,
wherein the heat storage accommodation unit includes a first transfer unit in outer periphery,
the driving unit includes a second transfer unit which drives rotation of the first transfer unit, and
the driving unit rotates the heat storage material accommodation unit by transferring power to the first transfer unit by the second transfer unit.

9. The chemical heat storage device according to claim 1,
wherein a distance between the adjacent heat transfer units is 5 to 10 times an average particle diameter of the chemical heat storage material.

10. The chemical heat storage device according to claim 3,
wherein a distance between the adjacent heat transfer units is 5 to 10 times an average particle diameter of the chemical heat storage material.

11. The chemical heat storage device according to claim 4,
wherein a distance between the adjacent heat transfer units is 5 to 10 times an average particle diameter of the chemical heat storage material.

12. The chemical heat storage device according to claim 5,
wherein a distance between the adjacent heat transfer units is 5 to 10 times an average particle diameter of the chemical heat storage material.

13. The chemical heat storage device according to claim 1,
wherein, when a depth of the heat storage material accommodation unit is set as 100%, a depth of the accommodated chemical heat storage material in the heat storage material accommodation unit is 40% to 60%.

14. The chemical heat storage device according to claim 2, wherein, when a depth of the heat storage material accommodation unit is set as 100%, a depth of the accommodated chemical heat storage material in the heat storage material accommodation unit is 40% to 60%.

15. The chemical heat storage device according to claim 3, wherein, when a depth of the heat storage material accommodation unit is set as 100%, a depth of the accommodated chemical heat storage material in the heat storage material accommodation unit is 40% to 60%.

* * * * *